United States Patent
Galat et al.

(10) Patent No.: US 12,078,523 B2
(45) Date of Patent: Sep. 3, 2024

(54) PREDICTING TRACK ASSEMBLY COMPONENT FAILURE USING DIRECT OIL CONTACT SENSOR DEVICE

(71) Applicant: Caterpillar Inc., Peoria, IL (US)

(72) Inventors: Michael Stephen Galat, Peoria, IL (US); Eric J. Johannsen, Washington, IL (US); Temitope O. Akinlua, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 15 days.

(21) Appl. No.: 17/810,718

(22) Filed: Jul. 5, 2022

(65) Prior Publication Data

US 2024/0011813 A1   Jan. 11, 2024

(51) Int. Cl.
*G01F 23/24*   (2006.01)
*F01M 11/12*   (2006.01)
*G01M 17/007*   (2006.01)

(52) U.S. Cl.
CPC .......... *G01F 23/241* (2013.01); *F01M 11/12* (2013.01); *G01M 17/007* (2013.01)

(58) Field of Classification Search
CPC ............. G01F 23/0007; G01F 23/0015; G01F 23/241; G01F 23/242; G01F 23/243; G01F 23/244; G01F 25/20; G01F 25/22; G01F 25/24; F01M 11/12; F16N 19/003; G01M 17/03
See application file for complete search history.

(56) References Cited

U.S. PATENT DOCUMENTS

| | | | | |
|---|---|---|---|---|
| 1,497,178 A | * | 6/1924 | Lorenz | G01F 23/241 33/716 |
| 2,202,197 A | * | 5/1940 | Ewertz | G01F 23/241 239/DIG. 15 |
| 3,328,789 A | * | 6/1967 | Pacheco | G01F 23/244 137/392 |
| 4,745,893 A | | 5/1988 | Atherton et al. | |
| 4,989,560 A | | 2/1991 | Rasdal et al. | |
| 7,581,434 B1 | * | 9/2009 | Discenzo | G01N 33/2888 73/53.01 |
| 8,043,768 B2 | | 10/2011 | Jang et al. | |
| 11,060,988 B2 | | 7/2021 | Baarman et al. | |

(Continued)

FOREIGN PATENT DOCUMENTS

| | | |
|---|---|---|
| CN | 105823527 A | 8/2016 |
| CN | 210768951 U | 6/2020 |

(Continued)

*Primary Examiner* — Herbert K Roberts (57) ABSTRACT

In some implementations, one or more devices may determine whether an electrical circuit is closed or open, the electrical circuit including electrodes of the sensor device, the electrical circuit being closed based on the electrodes being immersed in a lubricant in a cavity of a component of a track assembly of the machine, the electrical circuit being open based on the electrodes not being immersed in the lubricant in the cavity. The one or more devices may generate sensor data based on determining that the electrical circuit is open, the sensor data indicating that a level, of the lubricant in the cavity, does not satisfy a level threshold. The one or more devices may cause the machine to perform an action based on the sensor data indicating that the level does not satisfy the level threshold.

20 Claims, 5 Drawing Sheets

(56) References Cited

U.S. PATENT DOCUMENTS

| | | | |
|---|---|---|---|
| 2014/0116808 A1* | 5/2014 | Kile | ..................... B62D 55/092 |
| | | | 184/108 |
| 2015/0136527 A1 | 5/2015 | Kile | |
| 2017/0248092 A1* | 8/2017 | Radue | ................ F02M 35/0205 |
| 2022/0299539 A1* | 9/2022 | Horie | ....................... G01N 1/14 |

FOREIGN PATENT DOCUMENTS

| | | | |
|---|---|---|---|
| FR | 2932259 | A1 | 12/2009 |
| WO | 2021/240288 | A1 | 12/2021 |

* cited by examiner

PREDICTING TRACK ASSEMBLY COMPONENT FAILURE USING DIRECT OIL CONTACT SENSOR DEVICE

TECHNICAL FIELD

The present disclosure relates generally to predicting a failure of a component of a track assembly and, for example, to predicting the failure using a direct oil contact sensor device.

BACKGROUND

Components, of a track assembly of a machine, may be lubricated by oil to enable a proper operation of the track assembly. The components may include idlers and rollers. In some instances, the oil may be included in cavities of the components.

Over a period of time, the oil may leak out of the cavities. As a significant amount of oil leaks, the components may become insufficiently lubricated. In some situations, an operator may continue to operate the machine after the components have become insufficiently lubricated. Operating the machine in this manner may cause damage to the components, may cause damage to other components of the track assembly, and may eventually cause damage to the machine.

International Patent Application Publication No. WO2021240288 (the '288 publication) discloses a track pin assembly comprising a pin comprising a first axial end and a second axial end configured to engage a respective outer link of a joint. The '288 publication further discloses that the pin includes a first cavity which defines a tank for containing lubricating oil or grease. The '288 publication further discloses that the pin includes a second cavity arranged at the second axial end of the pin and open at the second axial end of the pin.

The '288 publication additionally discloses that the pin includes a sensor arranged in the second cavity and comprising a sensor element configured to measure a temperature and to generate a signal indicative of the measured temperature. While the '288 publication discloses that the pin includes the sensor arranged in the second cavity, the '288 publication does not address detecting wear of the pin.

The system of the present disclosure solves one or more of the problems set forth above and/or other problems in the art.

SUMMARY

In some implementations, a system includes a component of a track assembly of a machine; a sensor device configured to be provided in an oil reservoir of the component, the sensor device being configured to: determine whether an electrical circuit, including electrodes of the sensor device, is closed or open, the electrical circuit being closed based on the electrodes being immersed in oil in the oil reservoir, the electrical circuit being open based on the electrodes not being immersed in the oil in the oil reservoir, generate sensor data based on determining that the electrical circuit is open, the sensor data indicating that an oil level, of the oil in the oil reservoir, does not satisfy a level threshold; and a controller configured to cause the machine to perform an action based on the sensor data.

In some implementations, a method performed by one or more devices of a machine includes determining, by a sensor device of the machine, whether an electrical circuit is closed or open, the electrical circuit including electrodes of the sensor device, the electrical circuit being closed based on the electrodes being immersed in a lubricant in a cavity of a component of a track assembly of the machine, the electrical circuit being open based on the electrodes not being immersed in the lubricant in the cavity; generating, by the sensor device, sensor data based on determining that the electrical circuit is open, the sensor data indicating that a level, of the lubricant in the cavity, does not satisfy a level threshold; and causing, by a controller of the machine, the machine to perform an action based on the sensor data indicating that the level does not satisfy the level threshold.

In some implementations, a machine comprises: a track assembly; a sensor device provided in a cavity of a component of the track assembly, the sensor device being configured to: determine whether an electrical circuit, including electrodes of the sensor device, is closed or open, the electrical circuit being closed based on the electrodes being immersed in a lubricant in the cavity, the electrical circuit being open based on the electrodes not being immersed in the lubricant in the cavity, generate sensor data based on determining that the electrical circuit is open, the sensor data indicating that a level, of the lubricant in the cavity, does not satisfy a level threshold; and a controller configured to provide a notification based on the sensor data.

DETAILED DESCRIPTION

Implementations described herein are directed to predicting a failure of a component, of a track assembly of a machine, by determining whether the component has become insufficiently lubricated due to loss of oil and providing a notification that the component is insufficiently lubricated. For example, a system described herein may include a sensor device provided in an oil reservoir of the component (e.g., an oil reservoir in a shaft of the component). The sensor device may be a battery-powered signal transmitter that is configured to be immersed in oil in the oil reservoir.

The sensor device may include electrodes that are part of an electrical circuit. When a level of oil, in the oil reservoir, satisfies a level threshold, the electrodes may be immersed in and contact the oil, thereby causing the electrical circuit to be closed. Conversely, when the level of oil, in the oil reservoir, does not satisfy the level threshold, the electrodes may not be immersed in and may not be able to contact the oil, thereby causing the electrical circuit to be open.

The sensor device may determine whether the electrical circuit is open or closed based on whether the electrodes are immersed in the oil. The sensor device may generate sensor data indicating that the oil level, in the oil reservoir, does not satisfy the level threshold based on determining that the electrical circuit is open. In some situations, the sensor data may be wirelessly transmitted to a controller of the machine.

Based on the sensor data, the controller may provide a notification indicating that the level of oil, in the oil reservoir, does not satisfy the level threshold and/or indicating that the component will be experiencing a failure. By providing the notification in this manner, the controller may prevent the machine from being operated when the component is insufficiently lubricated.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
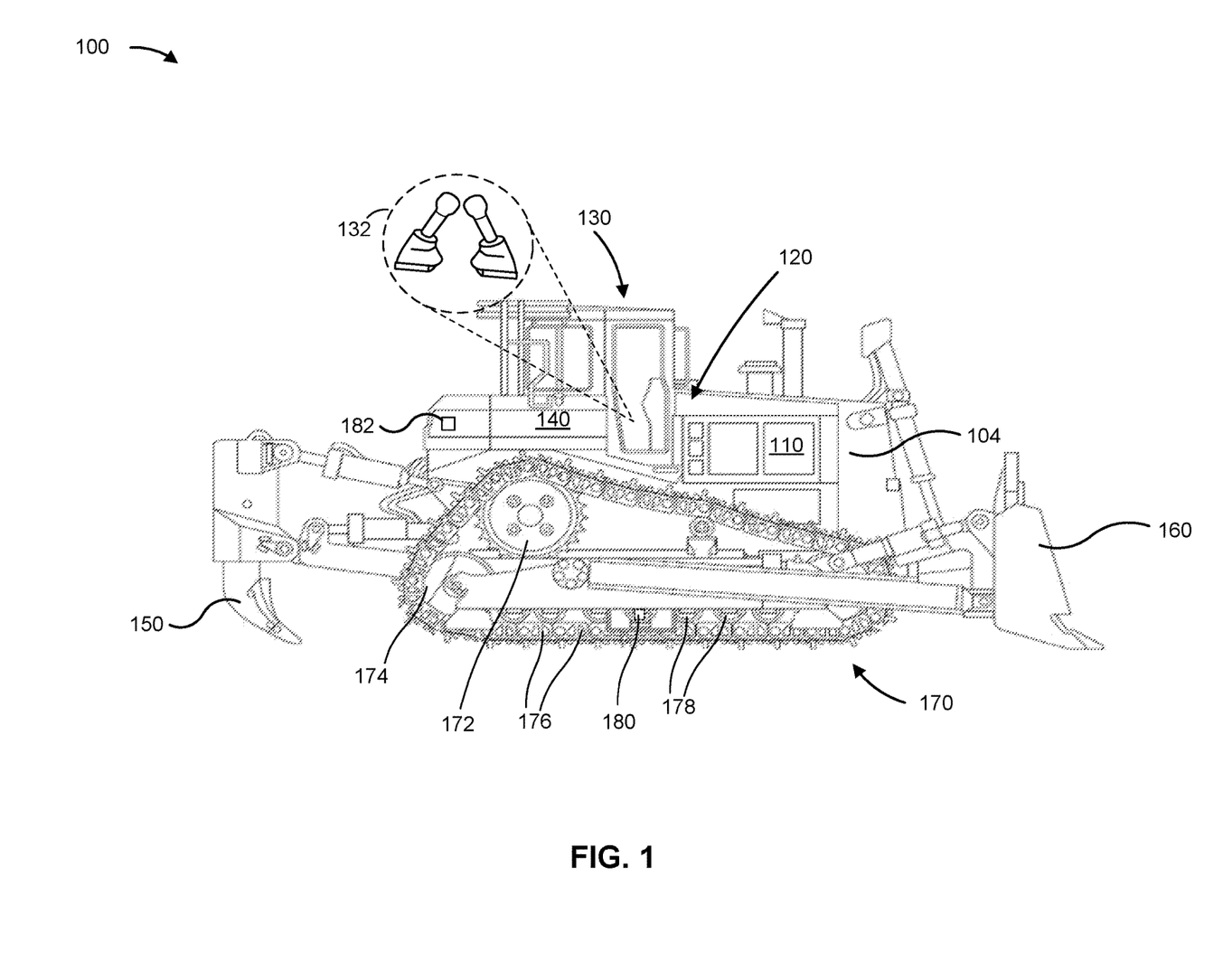
FIG. 1 is a diagram of an example machine described herein.

FIG. 1 is a diagram of an example machine 100 described herein. As shown in FIG. 1, machine 100 is embodied as an earth moving machine, such as a dozer. Alternatively, machine 100 may be another type of track-type machine, such as an excavator.

As shown in FIG. 1, machine 100 includes a chassis 104, an engine 110, a sensor system 120, an operator cabin 130, operator controls 132, a controller 140, a rear attachment 150, a front attachment 160, ground engaging members 170, sprocket 172, one or more idlers 174, one or more track links 176, one or more rollers 178, one or more sensor devices 180, and a wireless communication component 182.

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a velocity sensor device, a load sensor device, a pressure sensor device, a position sensor device, a temperature sensor device, a vibration sensor device, and/or a motion sensor device, among other examples.

Operator cabin 130 includes an integrated display (not shown) and operator controls 132. Operator controls 132 may include one or more input components (e.g., integrated joysticks, push-buttons, control levers, and/or steering wheels) to control an operation of machine 100. For example, operator controls 132 may be used to control an operation of one or more implements of machine 100 (e.g., rear attachment 150 and/or front attachment 160) and/or control an operation of ground engaging members 170.

For an autonomous machine, operator controls 132 may not be designed for use by an operator and, rather, may be designed to operate independently from an operator. In this case, for example, operator controls 132 may include one or more input components that provide an input signal for use by another component without any operator input.

Controller 140 (e.g., an electronic control module (ECM)) may control and/or monitor operations of machine 100. For example, controller 140 may control and/or monitor the operations of machine 100 based on signals from sensor device 180 and/or wireless communication component 182, as described in more detail below.

Rear attachment 150 may include a ripper assembly, a winch assembly, and/or a drawbar assembly. Front attachment 160 may include a blade assembly. Front attachment 160 and/or rear attachment 150 may be referred to as implements of machine 100. Ground engaging members 170 may be configured to propel machine 100. Ground engaging members 170 may include wheels, tracks, rollers, and/or similar components, for propelling machine 100. Ground engaging members 170 may include a track assembly that includes tracks (as shown in FIG. 1). The tracks may include track links 176.

Sprocket 172 may include one or more sprocket segments. Sprocket 172 may be configured to engage with ground engaging members 170 and to drive ground engaging members 170. In some examples, one or more idlers 174 and/or one or more rollers 178 may guide the tracks as the tracks rotate to propel machine 100. In some examples, sprocket 172 may be part of a transmission of machine 100. Sprocket 172, idlers 174, and/or rollers 178 may be components of the track assembly.

A component of the track assembly (e.g., sprocket 172, an idler 174, a track link pin of a track link 176, and/or a roller 178) may include an oil reservoir that is configured to store oil. The oil may enable the component to be lubricated to enable a proper operation of the track assembly. Sensor device 180 may include one or more devices that are configured to determine whether an oil level, of the oil in the oil reservoir, satisfies a level threshold and may generate sensor data indicating whether the oil level satisfies the level threshold (e.g., indicating whether the oil level enables the component to be sufficiently lubricated). In some situations, the sensor data may include information identifying sensor device 180 and/or information identifying the component.

As described in more detail below, sensor device 180 may be provided in the oil reservoir of the component, another sensor device 180 may be provided in an oil reservoir of another component of the track assembly, and so on. In some situations, the sensor data may be provided (e.g., via wireless communication component 182) to controller 140. Controller 140 may control an operation of machine 100 based on the sensor data, as described in more detail below.

Wireless communication component 182 may include one or more devices that are capable of communicating with one or more components of machine 100, one or more other machines, and/or one or more devices, as described herein. For example, wireless communication component 182 may receive the sensor data from sensor device 180 and may provide the sensor data to controller 140, to the one or more other machines, and/or to the one or more devices.

Wireless communication component 182 may include a transceiver, a separate transmitter and receiver, and/or an antenna, among other examples. Wireless communication component 182 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples. Additionally, or alternatively, wireless communication component 182 may communicate with the one or more other machines and/or the one or more devices via a network that includes one or more wired and/or wireless networks.

As indicated above, FIG. 1 is provided as an example. Other examples may differ from what is described in connection with FIG. 1.

Figure 2:
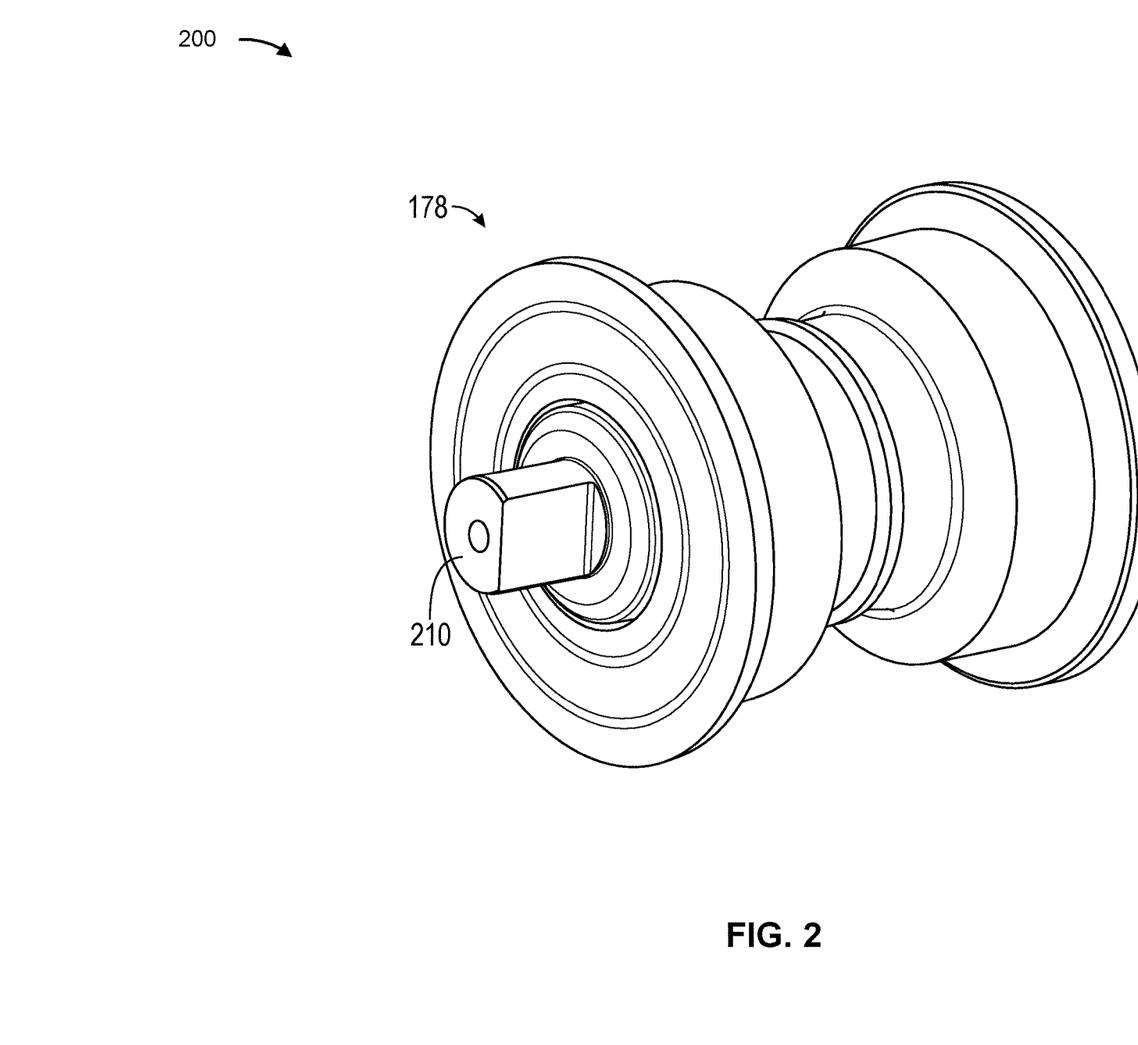
FIG. 2 is a diagram of an example component described herein.

FIG. 2 is a diagram of an example component 200, of the track assembly, described herein. As shown in FIG. 2, component 200 is illustrated as a roller similar to roller 178 discussed above in connection with FIG. 1. Alternatively, component 200 may be an idler, such as idler 174 discussed above in connection with FIG. 1. As shown in FIG. 2, component 200 may include a shaft 210. In some examples, shaft 210 may include a cavity that is configured to receive and store a lubricant, as described in more detail below. For example, shaft 210 may include an oil reservoir that is configured to receive and store oil. In some examples, the cavity may further be configured to receive sensor device 180, as described in more detail below.

As indicated above, FIG. 2 is provided as an example. Other examples may differ from what is described in connection with FIG. 2.

Figure 3:
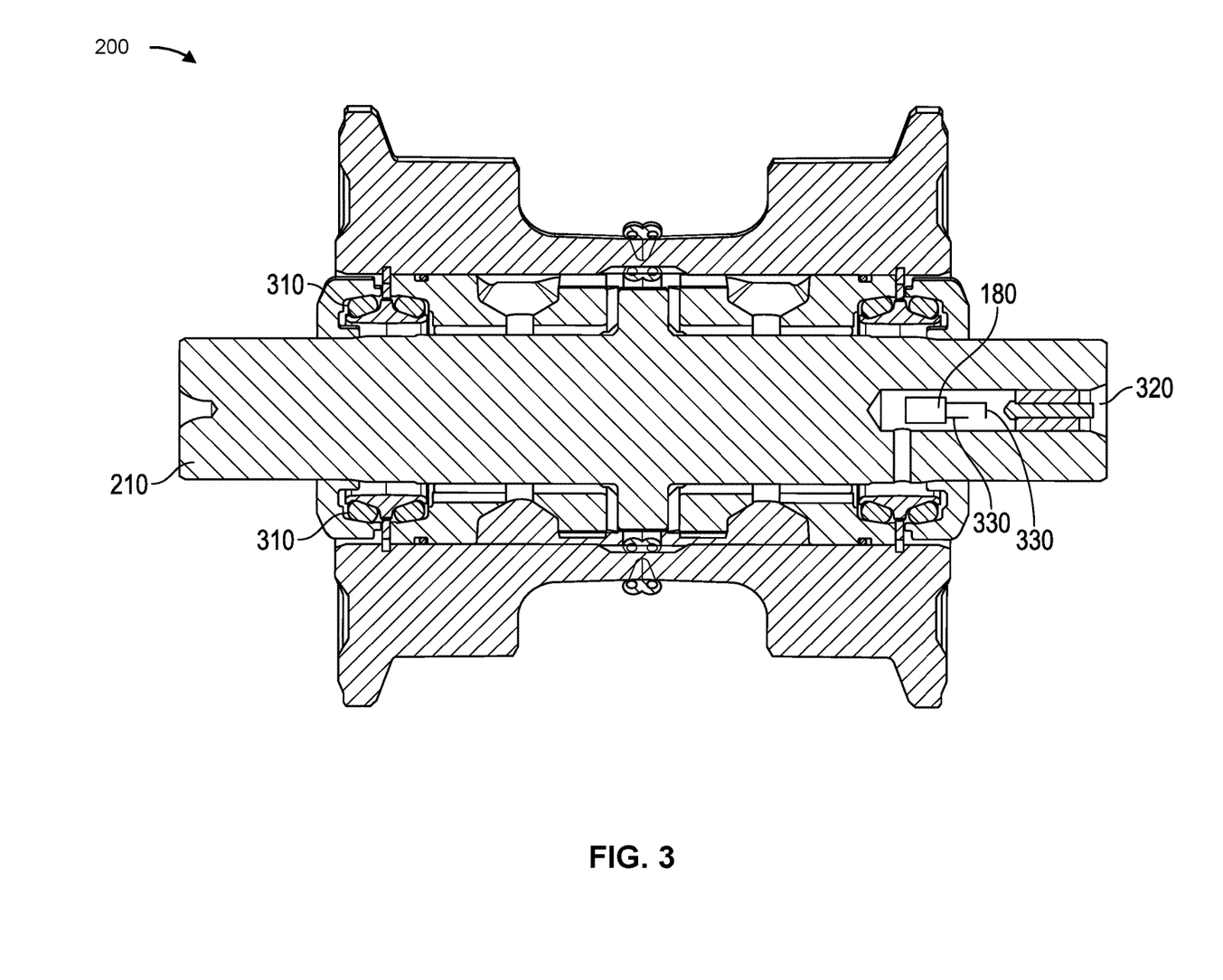
FIG. 3 is a cross-section view of an example component described herein.

FIG. 3 is a cross-section view of an example component 200 described herein. As shown in FIG. 3, component 200 may include sensor device 180, shaft 210, sealing components 310 (individually "sealing component 310" and collectively "sealing components 310"), and a cavity 320. Some of the elements of FIG. 3 have been described above in connection with FIGS. 1 and 2. In some implementations, sensor device 180 may be a battery powered signal transmitter (or battery powered transmitter). For example, sensor device 180 may include a power source (e.g., a battery) to provide power to sensor device 180 and a communication component (similar to wireless communication component 182) to transmit sensor data generated by sensor device 180. For instance, sensor device 180 may wirelessly transmit the sensor data to wireless communication component 182 and/or to controller 140.

As shown in FIG. 2, sensor device 180 may include electrodes 330. Electrodes 330 may be configured to determine whether a level of a lubricant, in cavity 320, satisfies the level threshold. In some situations, sensor device 180 may be pre-configured with information identifying the level threshold. Additionally, or alternatively, machine 100 may receive the information identifying the level threshold from a user device of an operator, a user device of a site manager, and/or a user device of an owner of machine 100. Additionally, or alternatively, machine 100 may receive the information identifying the level threshold from a back office system.

As shown in FIG. 3, shaft 210 may include cavity 320. Cavity 320 may be configured to store the lubricant. In some examples, the lubricant may be oil and cavity 320 may an oil reservoir that is configured to store the oil. The lubricant may be configured to provide electrical conductivity for an electrical circuit that includes electrodes 330. For example, the electrical circuit may be closed based on electrodes 330 being immersed in (and/or contacting) the lubricant in cavity 320. In this regard, electrodes 330 may be immersed in the lubricant such that electrodes 330 and the lubricant form a closed electrical circuit. Alternatively, the electrical circuit may be open based on electrodes 330 not being immersed in (and/or not contacting) the lubricant in cavity 320. Electrodes 330 may not be immersed in (and/or not contact) the lubricant as a result of the lubricant depleting over a period of time.

In some examples, sensor device 180 may be configured to determine whether the electrical circuit is open and may be configured to generate sensor data based on determining whether the electrical circuit is open. In some situations, the sensor data may indicate whether a level of the lubricant in cavity 320 (e.g., an oil level of the oil in the oil reservoir) satisfies the level threshold. For example, the sensor data may include first sensor data indicating that the level of the lubricant does not satisfy the level threshold based on sensor device 180 determining that the electrical circuit is open.

In some implementations, sensor device 180 may determine a period of time during which the electrical circuit is open and generate the first sensor data based on the period of time. For example, sensor device 180 may not generate the first sensor data based on determining that the electrical circuit is open for a first period of time. However, sensor device 180 may generate the first sensor data based on determining that the electrical circuit is open for a second period of time that exceeds the first period of time.

Sensor device 180 may generate the first sensor data in this manner to prevent the first sensor data from being generated prematurely (e.g., to prevent the first sensor data from being generated when component 200 is temporarily provided at an angle that prevents electrodes 330 from being immersed in the lubricant). Alternatively to the sensor data including the first sensor data, the sensor data may include second sensor data indicating that the level of the lubricant satisfies the level threshold based on determining that the electrical circuit is closed.

A sealing component 310 may be configured to prevent the lubricant from leaking. For example, sealing component 310 may be configured to retain the lubricant in appropriate conduits associated with the component to enable the component to remain sufficiently lubricated.

As indicated above, FIG. 3 is provided as an example. Other examples may differ from what is described in connection with FIG. 3.

Figure 4:
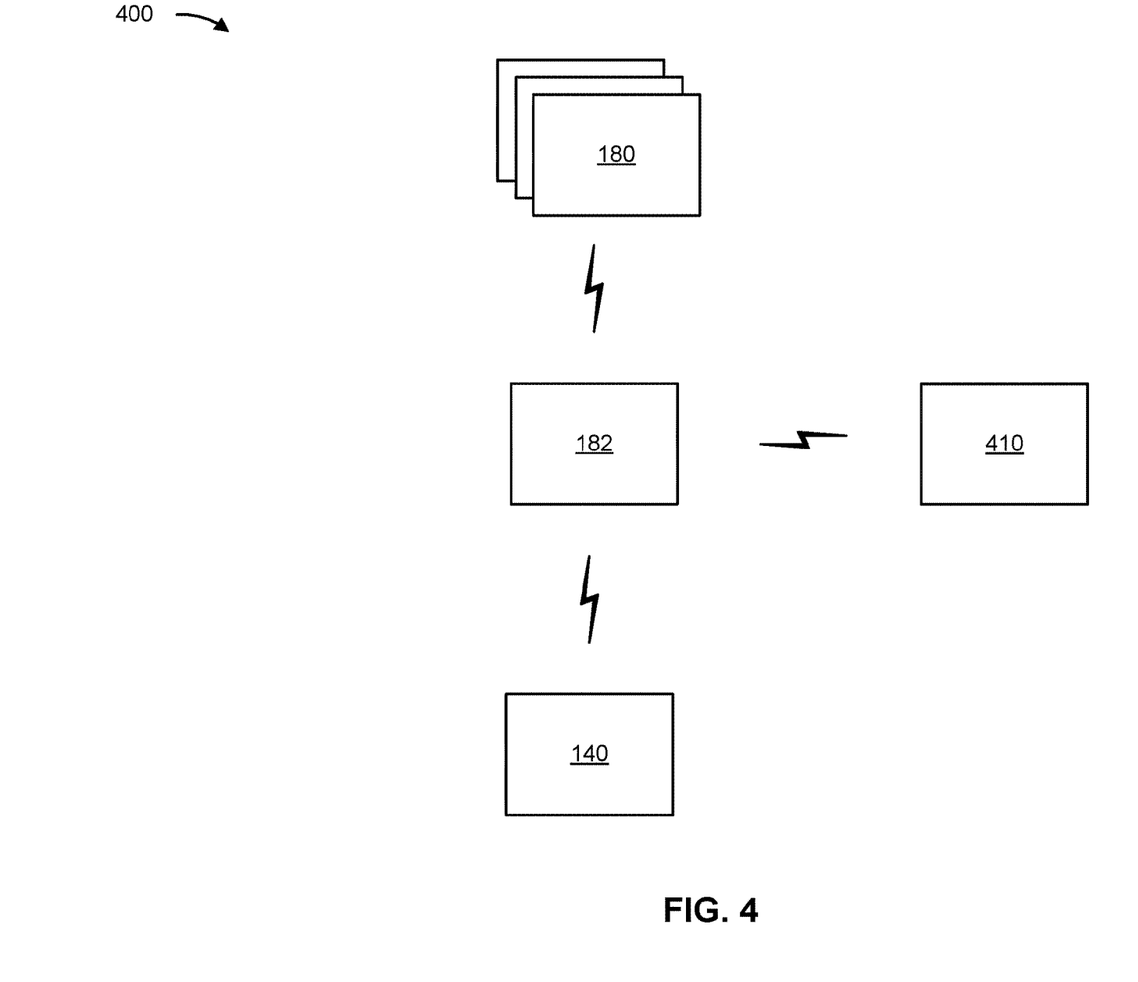
FIG. 4 is a diagram of an example system described herein.

FIG. 4 is a diagram of an example system 400 described herein. As shown in FIG. 4, system 400 includes controller 140, multiple sensor devices 180 (collectively "sensor devices 180" and individually "sensor device 180"), wireless communication component 182, and a device 410 associated with machine 100. Some of the elements of FIG. 4 have been described above in connection with FIGS. 1-3.

Controller 140 may include one or more processors and one or more memories. A processor may be implemented in hardware, firmware, and/or a combination of hardware and software. A processor may be capable of being programmed to perform a function. A memory may store information and/or instructions for use by a processor to perform the function. For example, when performing the function, controller 140 may control an operation of machine 100 based on the sensor data provided by sensor devices 180.

In some examples, each sensor device 180 may be included in a respective component of the track assembly of machine 100. In this regard, sensor information identifying a sensor device 180 may be stored, in a data structure, in association with component information identifying a component in which the sensor device 180 is configured to be included. The data structure may be a database, a table, and/or a linked list. The sensor information of a sensor device 180 may include a serial number of the sensor device 180, and/or a media access control (MAC) address associated with the sensor device 180, among other examples. The component information of a component of the track assembly may include a part number of the component, and/or a serial number of the component, among other examples.

Device 410 may include a display included in operator cabin 130. Additionally, or alternatively, device 410 may include the user device of the operator of machine 100, the user device of the site manager associated with machine 100, and/or the user device of the owner of machine 100. Additionally, or alternatively, device 410 may include a back office system (e.g., that monitors an operation of machine 100).

In some examples, controller 140 may receive the sensor data provided by sensor device 180 (e.g., included in component 200). Controller 140 may receive the sensor data from sensor device 180. Alternatively, sensor device 180 may provide the sensor data to wireless communication component 182 and wireless communication component 182 may provide the sensor data to controller 140. In some examples, wireless communication component 182 may provide the sensor data to device 410.

Sensor device 180 may generate the sensor data in a manner similar to the manner described above in connection with FIG. 3. The sensor data may include the sensor information identifying sensor device 180 and the component information identifying component 200. In some examples, controller 140 may cause machine 100 to perform the action based on the sensor data. For instance, based on the sensor data including the first sensor data, controller 140 may provide a notification to device 410. As an example, controller 140 may provide the notification to wireless communication component 182 and wireless communication component 182 may provide the notification to device 410.

In some situations, the notification may include the sensor information, the component information, information indicating that component 200 will be experiencing a failure, a first recommendation to service component 200, and/or a second recommendation to replace component 200. In some implementations, controller 140 may predict a time to failure based on information regarding a current utilization of machine 100, information regarding historical utilization of machine 100, information regarding an age of component 200, and/or information regarding a date of installation of component 200, among other examples.

In some situations, when causing machine 100 to perform the action, controller 140 may provide a command to restrict an operation of the machine based on the sensor data including the first sensor data. For example, controller 140 may provide a command to derate engine 110. For instance, controller 140 may provide the command to an engine controller associated with engine 110 to cause engine 110 to be derated.

In some examples, controller 140 may cause machine 100 to perform the actions discussed above based on different level thresholds. For example, controller 140 may provide the first recommendation based on determining that the level of the lubricant does not satisfy a first level threshold. Alternatively, controller 140 may provide the second recommendation and/or provide the command to derate engine 110 based on determining that the level of the lubricant does not satisfy a second level threshold. The first level threshold may exceed the second level threshold.

While the foregoing examples have been described with respect to sensor device 180 being included in an oil cavity of a roller (e.g., as roller 178), sensor device 180 may be included in different components of the track assembly such as sprocket 172, an idler 174, a track link pin of a track link 176, among other examples. With respect to the track link pin as an example, sensor device 180 may be inserted in an oil cavity of the track link pin. In this regard, electrodes 330 of sensor device 180 may be run in parallel in a ring configuration around the oil cavity of the track link pin. By providing electrodes 330 in this configuration, sensor device 180 may be able to detect the level of the lubricant irrespective of an orientation of the track link pin and an orientation of sensor device 180 in the track link pin.

As an example, if controller 140 detects a movement of machine 100 and determines that sensor device 180 has provided the first sensor data (based on sensor device 180 determining that the electrical circuit is open), controller 140 may determine that the level of the lubricant does not satisfy the level threshold. Alternatively, if controller 140 detects a movement of machine 100 and determines that sensor device 180 has provided the second sensor data (based on sensor device 180 determining that the electrical circuit is closed), controller 140 may determine that the level of the lubricant satisfies the level threshold.

The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the example component may perform one or more functions described as being performed by another set of devices of the example component.

Figure 5:
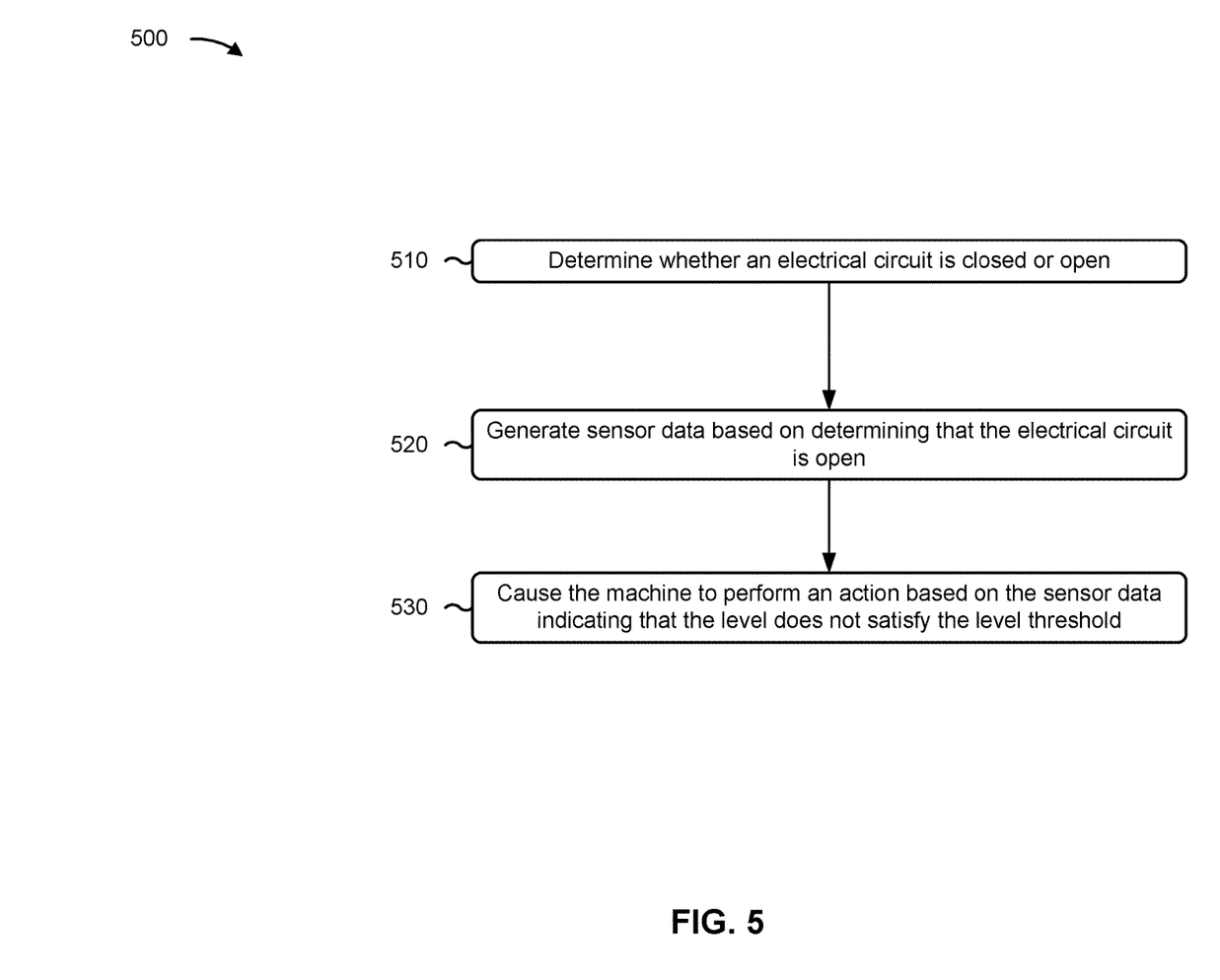
FIG. 5 is a flowchart of an example process relating to predicting a failure of a component of a track assembly.

FIG. 5 is a flowchart of an example process 500 relating to predicting a failure of a component of a track assembly. In some implementations, one or more process blocks of FIG. 5 may be performed by one or more devices (e.g., controller 140 and/or sensor device 180). In some implementations, one or more process blocks of FIG. 5 may be performed by another device or a group of devices separate from or including the one or more devices, such as a wireless communication component (e.g., wireless communication component 182), and/or a device (e.g., device 410).

As shown in FIG. 5, process 500 may include determining whether an electrical circuit is closed or open (block 510). For example, the one or more devices may determine whether an electrical circuit is closed or open, the electrical circuit including electrodes of the sensor device, the electrical circuit being closed based on the electrodes being immersed in a lubricant in a cavity of a component of a track assembly of the machine, the electrical circuit being open based on the electrodes not being immersed in the lubricant in the cavity, as described above.

The sensor device may be a battery-powered signal transmitter. The sensor device may be configured to be immersed in the oil in the oil in the oil reservoir.

As further shown in FIG. 5, process 500 may include generating sensor data based on determining that the electrical circuit is open (block 520). For example, the one or more devices may generate sensor data based on determining that the electrical circuit is open, the sensor data indicating that a level, of the lubricant in the cavity, does not satisfy a level threshold, as described above.

In some implementations, generating the sensor data comprises determining that the electrical circuit is open for a period of time; and generating the sensor data based on determining that the electrical circuit is open for the period of time. In some examples, process 500 may include wirelessly transmitting the sensor data to the controller.

As further shown in FIG. 5, process 500 may include causing the machine to perform an action based on the sensor data indicating that the level does not satisfy the level threshold (block 530). For example, the one or more devices may cause the machine to perform an action based on the sensor data indicating that the level does not satisfy the level threshold, as described above.

In some implementations, causing the machine to perform the action comprises providing a notification. The notification includes information identifying the sensor device, information identifying the component, information indicating that the component will be experiencing a failure, a first recommendation to service the component, or a second recommendation to replace the component.

The sensor data may be first data and the notification may be a first notification. Process 500 may include generating second sensor data based on determining that the electrical circuit is closed, the second sensor data indicating that the level, of the lubricant in the cavity, satisfies the level threshold; and providing a second notification indicating that the level, of the lubricant in the cavity, satisfies the level threshold based on the second sensor data.

In some implementations, causing the machine to perform the action comprises one or more of providing a command to restrict an operation of the machine based on the sensor data, providing a first command to schedule a service for the component based on the sensor data, or providing a second command to order a replacement of the component based on the sensor data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

Implementations described herein are directed to predicting a failure of a component, of a track assembly of a machine, by determining when the component becomes insufficiently lubricated and by providing a notification indicating that the component is insufficiently lubricated. For example, a system described herein may include a sensor device that is a battery-powered signal transmitter configured to be immersed in oil in an oil reservoir of the component.

The sensor device may include electrodes that are part of an electrical circuit. When a level of oil, in the oil reservoir, does not satisfy the level threshold, the electrodes may not be immersed in and may not be able to contact the oil, thereby causing the electrical circuit to be open. The sensor device may determine that the component is insufficiently lubricated based on the electrical circuit being open.

Determining whether the component is sufficiently lubricated may prevent the machine from operated when the component is insufficiently lubricated. Accordingly, determining whether the component is sufficiently lubricated may provide several advantages. For example, determining whether the component is sufficiently lubricated may prevent damage to the components, may prevent damage to other components of the track assembly, and may eventually prevent damage to the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
   a component of a track assembly of a machine;
   a sensor device configured to be provided in entirety in an oil reservoir of the component, the sensor device being configured to:
   determine that an electrical circuit, including electrodes of the sensor device, is open,
   the electrical circuit being open based on the electrodes not being immersed in oil in the oil reservoir,
   generate sensor data based on determining that the electrical circuit is open,
   the sensor data indicating that an oil level, of the oil in the oil reservoir, does not satisfy a level threshold, and
   the sensor device including a communication component configured to be in the oil reservoir and wirelessly transmit the sensor data to a wireless communication component of the machine or to a controller; and
   the controller,
   the controller being configured to cause the machine to perform an action based on the sensor data.

2. The system of claim 1, wherein, to cause the machine to perform the action, the controller is configured to:
   provide a notification to one or more devices associated with the machine,
   wherein the notification includes:
   information identifying the sensor device,
   information identifying the component, or
   information indicating that the component will be experiencing a failure.

3. The system of claim 1, wherein the component includes a roller, an idler, or a track joint.

4. The system of claim 1, wherein the sensor data is first sensor data, and wherein the sensor device is further configured to:
   generate second sensor data based on determining that the electrical circuit is closed, the second sensor data indicating that the oil level, in the oil reservoir, satisfies the level threshold.

5. The system of claim 1, wherein the sensor device is further configured to:
determine that the electrical circuit is open for a first period of time;
determine that the electrical circuit is open for a second period of time that exceeds the first period of time; and
generate the sensor data based on determining that the electrical circuit is open for the second period of time,
wherein the sensor data is not generated based on determining that the electrical circuit is open for the first period of time.

6. The system of claim 1, wherein the sensor device is configured to be immersed in the oil in the oil in the oil reservoir.

7. The system of claim 1, wherein the sensor device further includes a battery configured to be in the oil reservoir and provide power to the sensor device and the communication component.

8. The system of claim 1, further comprising:
another sensor device configured to be provided in entirety in another oil reservoir of another component of the track assembly; and
the wireless communication component,
wherein the wireless communication component is configured to:
receive the sensor data from the communication component, and
provide the sensor data to one or more of the controller or one or more other machines.

9. A method, comprising:
determining, by a sensor device provided in entirety in a cavity of a track assembly of a machine, that an electrical circuit is open,
the electrical circuit including electrodes of the sensor device, and
the electrical circuit being open based on the electrodes not being immersed in a lubricant in the cavity;
generating, by the sensor device provided in entirety in the cavity, sensor data based on determining that the electrical circuit is open,
the sensor data indicating that a level, of the lubricant in the cavity, does not satisfy a level threshold;
wirelessly transmitting, by a communication component of the sensor device provided in entirety in the cavity, the sensor data to a wireless communication component of the machine or a controller of the machine; and
causing, by the controller of the machine, the machine to perform an action based on the sensor data indicating that the level does not satisfy the level threshold.

10. The method of claim 9, wherein generating the sensor data comprises:
determining that the electrical circuit is open for a period of time; and
generating the sensor data based on determining that the electrical circuit is open for the period of time.

11. The method of claim 9,
wherein causing the machine to perform the action comprises:
providing a notification, and
wherein the notification includes:
information identifying the sensor device,
information identifying the component,
information indicating that the component will be experiencing a failure,
a first recommendation to service the component, or
a second recommendation to replace the component.

12. The method of claim 11, wherein the sensor data is first data and the notification is a first notification, and
wherein the method further comprises:
generating second sensor data based on determining that the electrical circuit is closed,
the second sensor data indicating that the level, of the lubricant in the cavity, satisfies the level threshold; and
providing a second notification indicating that the level, of the lubricant in the cavity, satisfies the level threshold based on the second sensor data.

13. The method of claim 9, wherein causing the machine to perform the action comprises:
providing a command to restrict an operation of the machine based on the sensor data.

14. The method of claim 9, further comprising:
providing a first command to schedule a service for the component based on the sensor data; or
providing a second command to order a replacement of the component based on the sensor data.

15. A machine comprising:
a track assembly;
a sensor device provided entirely in a cavity of a component of the track assembly, the sensor device being configured to:
determine whether an electrical circuit, including electrodes of the sensor device, is closed or open,
the electrical circuit being closed based on the electrodes being immersed in a lubricant in the cavity, and
the electrical circuit being open based on the electrodes not being immersed in the lubricant in the cavity,
generate sensor data based on whether the electrical circuit is open,
the sensor data indicating whether a level, of the lubricant in the cavity, does not satisfy a level threshold, and
the sensor device including a communication component configured to wirelessly transmit the sensor data to a wireless communication component of the machine or to a controller; and
the controller,
the controller being configured to provide a notification based on the sensor data.

16. The machine of claim 15, wherein the component includes a roller, an idler, or a track joint, and
wherein the sensor device is configured to be immersed in the lubricant in the cavity.

17. The machine of claim 16,
wherein the lubricant is oil, and
wherein the cavity is an oil reservoir in a shaft of the component.

18. The machine of claim 15, wherein the notification includes:
information identifying the sensor device,
information identifying the component, and
information indicating that the component will be experiencing a failure.

19. The machine of claim 15, wherein, to generate the sensor data, the sensor device is further configured to:
determine that the electrical circuit is open for a period of time; and
generate the sensor data based on determining that the electrical circuit is open for the period of time.

20. The machine of claim 15, wherein the notification includes:
 information identifying the component, and
 one of:
  a first recommendation to service the component, or
  a second recommendation to replace the component, and
 wherein the controller is further configured to:
  provide a command to schedule a service for the component based on the first recommendation, or
  provide a command to order a replacement of the component based on the second recommendation.

\* \* \* \* \*